United States Patent Office 3,427,070
Patented Feb. 11, 1969

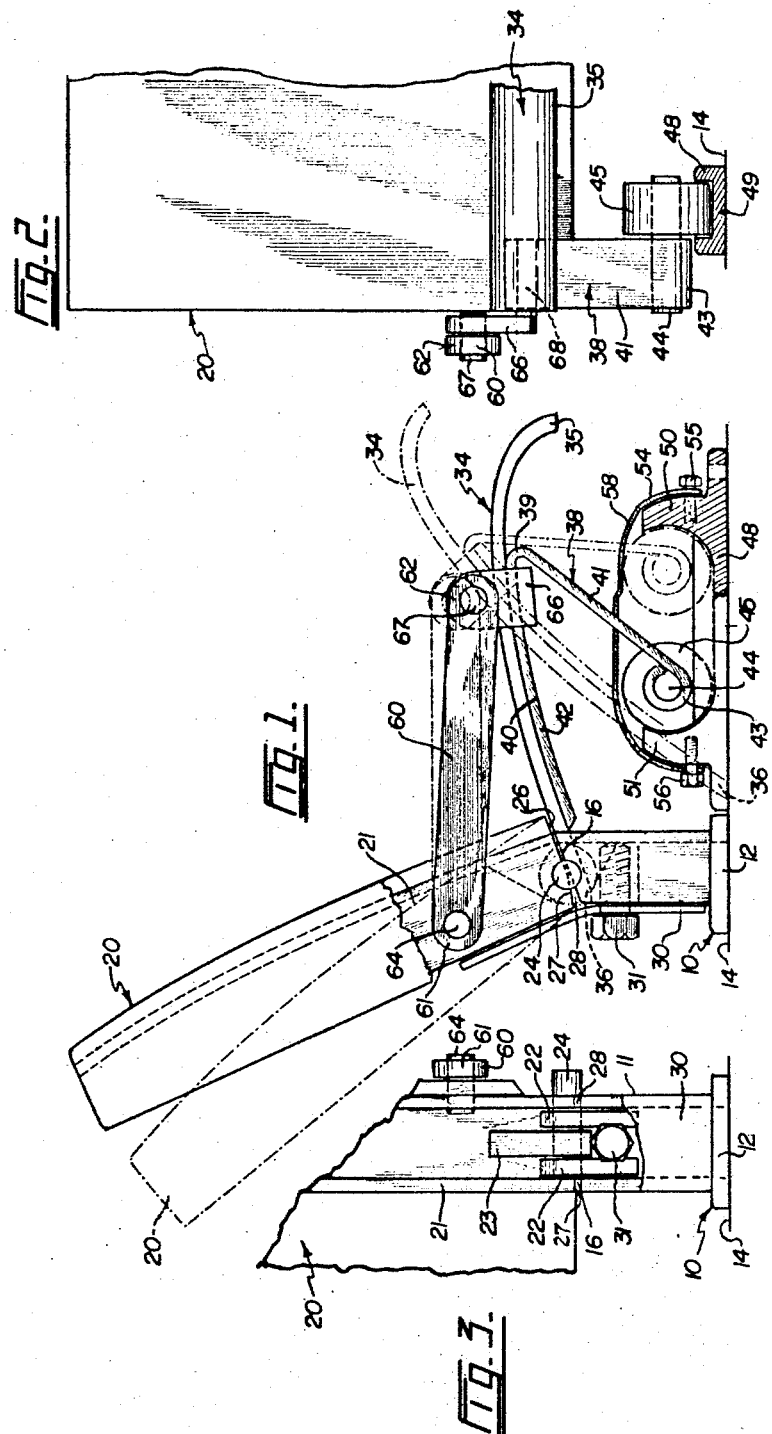

3,427,070
SAFETY SEAT FOR VEHICLES
George Wallach, 12565 24th Ave., White Rock,
British Columbia, Canada
Filed Oct. 3, 1966, Ser. No. 584,012
U.S. Cl. 297—216      12 Claims
Int. Cl. B60r 21/10

ABSTRACT OF THE DISCLOSURE

A vehicle seat having a portion which will be collapsed rearwardly by the weight of an occupant should the vehicle be involved in a front end collision.

Background of the invention

This invention relates to a shock absorbing seat adaptable for use in aircraft but more particularly intended for use in safeguarding occupants of a motor vehicle.

In an automobile accident, a person can receive serious and often fatal injuries when he is hurled forward against the dash or windscreen as the result of a front end collision, or when he is snapped rearwardly by the impact of a rear end collision. Attempts have been made to provide a seat which will absorb some of the shock of impact incidental to these two common accidents but such devices have many disadvantages. For example, they are of such complex construction as to be expensive to manufacture and, more importantly, they are subject to mechanical failure.

Summary of the invention

The present safety seat is designed to function automatically to position the occupant so that his body is better able to absorb the shock of impact than if he remained in the normal upright seated position and also to reduce the risk of being thrown violently from the seat. The seat is equipped with springs which dampen the shock of a sudden and violent stop, and with braking means which apply automatically just before the seat and the occupant are finally brought to a halt, thus further reducing shock and lessening the risk of internal injury to the occupant. An additional advantage of the present seat is that it can easily be returned to normal position of use following a collision without the need for adjustment or reassembly.

Brief description of the drawing

FIGURE 1 is a side elevation of the safety seat, with some parts broken away and other parts shown in section, FIGURE 2 is a fragmentary front elevation, partly in section, of a portion of the seat with some parts omitted, and FIGURE 3 is a fragmentary rear elevation of the same portion of the seat, with parts broken away and other parts not shown.

Description of the preferred embodiments

The drawings illustrate the right side only of the seat but it will be understood that the left side is of identical construction. In order to better illustrate the essential parts of the invention, the customary padding, upholstery, and other fittings have been omitted from the concerned parts of the safety seat.

The safety seat illustrated is provided with a base generaly indicated by the numeral 10 and comprising two transversely spaced and vertically disposed columns 11. Base columns 11 have bottom flanges 12 which are firmly anchored to the floor 14 of the vehicle by means of bolts or other suitable fasteners, not shown. The columns 11 have upper edges 16 (FIGURE 1) which are inclined downwardly and rearwardly at a slight angle to the horizontal. These columns are preferably of channel construction, as shown best in FIGURE 3.

The safety seat is provided with a back, generally indicated by the numeral 20, and comprising two vertical columns 21, see FIGURES 1 and 3. The columns 21 are disposed above the base column 11 and preferably are of the same channel construction. As shown best in FIGURE 3, lugs 22 are provided on and at the upper ends of the columns 11, the lugs being spaced apart and projecting above the inclined edge 16. The columns 21 have lugs 23 at their lower ends which enter between the transversely spaced lugs 22 and pins 24 are projected through suitable openings in the several lugs to pivotally secure the back 20 to the base 10. Normally, the back 20 is rearwardly inclined as shown by solid lines in FIGURE 1. At this time, when the safety seat is unoccupied, the lower edges 26 of the columns 21 are disposed parallel to the inclined edges 16 of the columns 11. It will be noted, however, that the edges 26 have rear faces 27 which, when the back 20 is in the normally inclined position, are disposed at an acute angle to the edges 16 so as to define therewith, wedge-shaped slots indicated by the numeral 28. Thus, the back 20 can rock or tilt about the pivot pins 24 from the solid to the chain dotted line position of FIGURE 1. When the seat is in the chain dotted line or rearwardly tilted position, the faces 27 bear against the edges 16 and thus limit the angle to which the back 20 can be tilted to the rear.

Leaf springs 30 are secured to the rear faces of the columns 11 by means of bolts 31, which springs extend upwardly and bear against the rear faces of the columns 21. The leaf springs 30 urge the back 20 toward the normally inclined position and some tension must be applied to said springs before said back can be swung rearwardly to the fully inclined or tilted position.

The safety seat has a seat portion indicated by the numeral 34 and having a front edge 35 and a rear edge 36. The longitudinally curving seat portion is downwardly turned adjacent the front edge 35 and the rear edge 36 of said seat position is disposed beneath the back 20, but is not connected thereto.

Transversely spaced leaf springs 38 are secured to the underside of the seat portion 34, these springs having front bends 39 near their upper parts, 40, downwardly and rearwardly inclined front legs 41, and rearwardly projecting upper legs 42. Legs 42 are curved to conform to the curvature of the seat 1 and are suitably secured thereto. The lower ends of the legs 41 are formed into loops 43, the loops being fitted with horizontal and transversely extending pins 44. Journalled on the pins 44 are small rollers 45. Preferably, two springs are used to support the seat portion as described but it will be appreciated that a single leaf spring would serve the desired purpose. A single leaf spring would be centrally disposed to extend substantialy from side-edge to side-edge of the seat portion and preferably would be fitted with a single centrally disposed roller.

The rollers 45 ride on tracks 48 which are suitably secured to the floor 14 of the vehicle in front of the base 10. The tracks 48 are channel-like members 49 having front bumpers 50 and rear bumpers 51. The tracks 48 are fitted with housings 54 which are secured to the front and rear bumpers by means of bolts 55 and 56. The housings 54 are formed of a suitable flexible material and the forward ends thereof are reduced in height to provide housing parts which serve as brake shoes 58. It will be noted the distance between the inner surfaces of the shoes 58 and the top surfaces of the tracks 48 is less than the diameter of the rollers 45. Thus, the resilient housings 54 are required to be sprung slightly in order for the rollers to contact the front bumpers 50.

The safety seat is provided with connecting links or arms 60 formed of bars having rear ends 61 and front ends 62. Pivot pins 64 secure the ends 61 to the columns 21. L-shaped brackets 66 are secured to the ends 62 of the arms by means of pivot pins 67, the inwardly projecting and horizontal legs 68 (FIGURE 2) of the brackets extending beneath the upper parts 40 of the springs 38 on which the seat portion 34 is supported. Suitable means, not shown, secure the brackets 66 to the springs 38. Thus, the seat portion 34 normally is supported in the solid line position of FIGURE 1 with its downwardly turned front edge 35 projecting beyond the brackets 66. When the seat portion is in this normal position, the arms 60 are substantially horizontal and the rollers 45 are in abutment with the rear bumpers 51. The seat portion 34, the springs 38, and the rollers 45 are adapted to shift forwardly from the normal position, to a collapsed position which is indicated by the chain dotted lines in FIGURE 1, at which time the edge 36 of the seat can swing downwardly around pins 67. As this collapsing occurs, the back 20 remains stationary or in the solid line position. Back 20 is adapted to be tilted rearwardly, independently of the seat portion and associated parts, to the chain dotted line position of FIGURE 1.

It will be noted, the rear ends 61 of the arms need not be connected directly to the back 20 but may be pivotally connected to a suitable part of the vehicle body, in which case substantially the same collapsing action of the seat portion would be achieved. The back 20 would still be mounted to tilt independently of the remainder of the seat and preferably would be pivotally mounted to provide the same limited rearward movement as before. It is essential only that suitable pivot means be provided for connecting the rear ends of the arms 60 to a convenient part of the vehicle. As previously described in detail, the preferred pivot means for connecting the arms to the vehicle is the base 10, back 20, and parts associated therewith.

When the safety seat is occupied and therefore subjected to a normal load, the springs 38 are tensioned slightly by the weight of the occupant who is then comfortably supported by the device with said springs flexing slightly when the occupant shifts his weight about in the seat. At the same time, the lower edges 26 of the columns 21 are in abutment with the upper edges 16 of the columns 11. Thus the back 20 cannot move forward and the seat portion 34 is supported by the arms 60 and the springs 38, the rollers 45 then being pressed against the rear bumpers 51.

It will be recalled the legs 42 of the leaf springs are secured to the seat portion 34. As the seat portion 34 takes the weight of an occupant, the upper parts 40 swing downwardly and forwardly to a slight extent while the front legs 41 are curved in the same direction and are swung towards the upper legs 42. At the same time, the forward ends of the arms 60 swing downwardly to the same slight extent. These movements of the seat place the center of gravity of the occupant slightly forward of the rollers 45, which rollers are then pressed firmly against the rear bumpers 51. The seat will remain in this overbalanced position unless the occupant deliberately attempts to tilt the seat or until the seat collapses as it is designed to do in response to a collision.

If the vehicle is involved in a front end collision, the force of inertia places an overload on the device which causes the seat portion 34 to collapse. During this collapsing movement, the springs 38 are first tensioned further to absorb part of the shock of impact and are then snapped forward along with the seat portion 34, the springs and seat portion rotating about the pivot pins 67. The rollers 45 also snap forward but before said rollers contact the front bumpers 50, their momentum is slowed by the action of the brake shoes 58. Thus, the springs 38 and also the seat portion 34 are gradually decelerated before reaching the fully collapsed state, indicated by the chain dotted lines in FIGURE 1, at which time further movement is halted by the rollers 45 contacting the front bumpers 50. As the rear edge 36 of the seat portion swings downwardly and forwardly, the body of the occupant is caused to assume a position which pins him in the collapsed seat. Since the occupant is so positioned and the force of impact is cushioned by the action of the springs 38 and the brake shoes 58, he is better able to take the final shock of impact without injury and is less likely to be thrown forward against the dash or the windscreen. Once the overload is removed from the seat, the seat portion 34 and the springs 38 are returned to their normal positions by a slight force which is exerted to release the rollers 45 from the brake shoes 58.

In the event of a rear end collison, the back 20 will swing to the rearward tilt position and in doing so will be required to flex the springs 30. This slight "give" to the back of the seat and the cushioning effect of the springs 30 will do much to reduce the possibility of serious injury to the occupant of the seat.

What is claimed is:

1. A safety seat for a vehicle comprising a seat portion having a front edge and a rear edge, a leaf spring supporting the seat portion above the vehicle floor in substantially horizontal position under normal load conditions and having an upper part, an arm having a front end and a rear end, first pivot means connecting the rear end of the arm to the vehicle, second pivot means connecting the front end of the arm to the upper part of the leaf spring near the front edge of the seat portion, said seat portion and leaf spring being rotated about the second pivot means when the rear edge of said seat portion is swung downwardly and forwardly in response to an overload on the seat portion.

2. A safety seat as claimed in claim 1, in which said leaf spring has a lower end which is moved forwardly when said leaf spring is rotated as aforesaid, and means for limiting the forward movement of the lower end of the leaf spring.

3. A safety seat as claimed in claim 2, and including a roller on the lower end of the leaf spring.

4. A safety seat for a vehicle comprising a base adapted to be secured to the vehicle floor, a back supported by the base, a seat portion having a front edge and a rear edge, a leaf spring supporting the seat portion above the vehicle floor in substantially horizontal position under normal load conditions and having an upper part and a lower end, an arm having a front end and a rear end pivotally secured to the back, pivot means securing the front end of the arm to the upper part of the leaf spring near the front edge of the seat portion, a roller on the lower end of the leaf spring, said seat portion and the leaf spring rotating about the pivot means when the rear edge of said seat portion is swung downwardly and forwardly in response to an overload on the seat portion.

5. A safety seat as claimed in claim 4, and including hinge means securing the lower edge of the back to the base, means for halting swinging movement of the back forward of a normally inclined position, and means for halting swinging movement of the back beyond a rearwardly tilted position.

6. A safety seat as claimed in claim 5, and including spring means to resist rearward swinging movement of the back.

7. A safety seat as claimed in claim 4, and including a track secured to the vehicle floor and in which said roller is mounted, said track having a front bumper and a rear bumper, said rear bumper serving as a stop for the roller when the leaf spring is under tension incidental to a normal load on the seat portion, and said front bumper serving as a stop for the roller when the seat portion and leaf spring are rotated about the pivot means.

8. A safety seat as claimed in claim 7, and including a cover extending over the front and rear bumpers to confine the roller within the track.

9. A safety seat as claimed in claim 8, in which said cover includes a brake shoe adjacent the front bumper, said roller engaging the brake shoe prior to contacting the front bumper.

10. A safety seat for a vehicle comprising a back, a seat portion having a front edge and a rear edge, means pivotally connecting the back to the seat portion near the front edge thereof, spring means resiliently supporting the seat portion in substantially horizontal position under normal load conditions and being such that the rear edge of the seat portion will swing downwardly and forwardly under overload conditions to support an occupant against being thrown forwardly, said spring means including a leaf spring having a downwardly and rearwardly inclined front leg, said front leg having a lower end, a front bumper mounted on the vehicle floor to halt forward movement of the lower end of the front leg, and a rear bumper mounted on the vehicle floor, to halt rearward movement of the lower end of the front leg.

11. A safety seat as claimed in claim 10, and including a roller journalled on the lower end of the front leg for engagement with the front and rear bumpers.

12. A safety seat as claimed in claim 11, and including a brake shoe projecting rearwardly of the front bumper and adapted to be engaged by the roller prior to said roller engaging said front bumper.

References Cited

UNITED STATES PATENTS

| | | | |
|---|---|---|---|
| 1,964,424 | 6/1934 | Borah | 248—387 |
| 2,346,895 | 4/1944 | Bergman | 297—216 |
| 2,660,222 | 11/1953 | Woodsworth | 297—216 |
| 2,725,921 | 12/1955 | Markin | 297—216 |
| 2,732,005 | 1/1956 | Corning | 297—306 |
| 2,796,112 | 6/1957 | Barsky | 297—216 |
| 2,818,909 | 1/1958 | Burnett | 297—216 |
| 2,823,730 | 2/1958 | Lawrence | 297—216 |
| 3,261,642 | 7/1966 | Flint | 297—309 |
| 3,309,136 | 3/1967 | Kehoe | 297—296 |
| 2,163,078 | 6/1939 | Zerbee | 297—421 |

FOREIGN PATENTS 830,902   2/1952   Germany.

FRANCIS K. ZUGEL, *Primary Examiner.*

U.S. Cl. X.R.

297—296, 341